(12) United States Patent
Schmalenberg et al.

(10) Patent No.: US 10,333,209 B2
(45) Date of Patent: Jun. 25, 2019

(54) COMPACT VOLUME SCAN END-FIRE RADAR FOR VEHICLE APPLICATIONS

(71) Applicant: Toyota Motor Engineering & Manufacturing North America, Inc., Erlanger, KY (US)

(72) Inventors: Paul D. Schmalenberg, Ann Arbor, MI (US); Meijiao Li, Davis, CA (US); Jae Seung Lee, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 139 days.

(21) Appl. No.: 15/213,769

(22) Filed: Jul. 19, 2016

(65) Prior Publication Data
US 2018/0026356 A1    Jan. 25, 2018

(51) Int. Cl.
*H01Q 1/36*    (2006.01)
*H01Q 1/32*    (2006.01)
(Continued)

(52) U.S. Cl.
CPC ......... *H01Q 1/3283* (2013.01); *G01S 13/931* (2013.01); *H01Q 3/28* (2013.01);
(Continued)

(58) Field of Classification Search
CPC .... H01Q 1/3233; H01Q 1/3283; H01Q 3/005; H01Q 21/064; H01Q 13/085; H01Q 3/28;
(Continued)

(56) References Cited

U.S. PATENT DOCUMENTS 4,298,873 A    11/1981   Roberts
4,414,550 A    11/1983   Tresselt
(Continued)

FOREIGN PATENT DOCUMENTS

CN    104122556    10/2014
DE    102013100554    1/2013
(Continued)

OTHER PUBLICATIONS

The ARRL Antenna Book, by Gerald Hall (Year: 1988).*
(Continued)

*Primary Examiner* — Jessica Han
*Assistant Examiner* — Awat M Salih
(74) *Attorney, Agent, or Firm* — Snell & Wilmer LLP

(57) ABSTRACT

A vehicular radar system with antenna structures to provide volumetric radar scanning for use in vehicles. The vehicular radar system includes a first antenna array having two or more tapered slot end-fire antennas. The vehicular radar system includes a second antenna array having two or more tapered slot end-fire antennas positioned adjacent to the two or more tapered slot end-fire antennas such that the first antenna array is stacked above the second antenna array. A radio frequency integrated circuit (RFIC) is coupled to the first antenna array and the second antenna array. The RFIC is configured to control each of the two or more tapered slot end-fire antennas of the first antenna array and the two or more tapered slot end-fire antennas of the second antenna array to transmit a signal. At least some signals have different phases so they may be combined to form a three-dimensional radar beam.

20 Claims, 10 Drawing Sheets

(51) Int. Cl.
*H01Q 3/28* (2006.01)
*G01S 13/93* (2006.01)
*H01Q 13/08* (2006.01)
*H01Q 21/06* (2006.01)

(52) U.S. Cl.
CPC ......... *H01Q 13/085* (2013.01); *H01Q 21/064* (2013.01); *G01S 2013/9375* (2013.01); *G01S 2013/9378* (2013.01)

(58) Field of Classification Search
CPC ........... G01S 13/931; G01S 2013/9375; G01S 2013/9378
See application file for complete search history.

(56) References Cited

U.S. PATENT DOCUMENTS

| | | | |
|---|---|---|---|
| 5,023,623 | A | 6/1991 | Kreinheder et al. |
| 5,023,624 | A | 6/1991 | Heckaman et al. |
| 5,227,808 | A | 7/1993 | Davis |
| 5,400,042 | A | 3/1995 | Tulintseff |
| 5,486,832 | A | 1/1996 | Hulderman |
| 5,557,291 | A | 9/1996 | Chu et al. |
| 5,767,793 | A | 6/1998 | Agravente et al. |
| 5,872,542 | A | 2/1999 | Simons et al. |
| 5,874,915 | A | 2/1999 | Lee et al. |
| 5,940,011 | A | 8/1999 | Agravante et al. |
| 6,046,703 | A | 4/2000 | Wang et al. |
| 6,061,035 | A | 5/2000 | Kinasewitz et al. |
| 6,154,176 | A | 11/2000 | Fathy et al. |
| 6,317,094 | B1 | 11/2001 | Wu et al. |
| 6,366,254 | B1 | 4/2002 | Sievenpiper et al. |
| 6,496,151 | B1 | 12/2002 | Ferreri et al. |
| 6,496,155 | B1 | 12/2002 | Sievenpiper et al. |
| 6,549,170 | B1 | 4/2003 | Kuo et al. |
| 6,624,845 | B2 | 9/2003 | Loyd et al. |
| 6,815,739 | B2 | 11/2004 | Huff et al. |
| 6,950,062 | B1 | 9/2005 | Mather et al. |
| 7,109,938 | B2 | 9/2006 | Franson et al. |
| 7,170,446 | B1 | 1/2007 | West et al. |
| 7,268,732 | B2 | 9/2007 | Gotzig et al. |
| 7,411,542 | B2 | 8/2008 | O'Boyle |
| 7,532,170 | B1 | 5/2009 | Lee et al. |
| 7,728,772 | B2 | 6/2010 | Mortazawi et al. |
| 7,742,004 | B2 | 6/2010 | Fukushima et al. |
| 7,821,355 | B2 | 10/2010 | Engel et al. |
| 7,924,226 | B2 | 4/2011 | Soler Castany et al. |
| 8,175,512 | B2 | 5/2012 | Cornwell |
| 8,259,032 | B1 | 9/2012 | Buckley |
| 8,405,468 | B2 | 3/2013 | Uchaykin |
| 8,576,111 | B2 | 11/2013 | Smith et al. |
| 8,604,991 | B2 | 12/2013 | Nagayama |
| 8,836,592 | B2 | 9/2014 | Paulus et al. |
| 8,902,117 | B2 | 12/2014 | Ohno et al. |
| 8,912,968 | B2 | 12/2014 | Sharma et al. |
| 8,922,448 | B2 | 12/2014 | Wong et al. |
| 8,952,678 | B2 | 2/2015 | Giboney et al. |
| 9,013,365 | B2 | 4/2015 | Lee et al. |
| 9,065,163 | B1 | 6/2015 | Wu et al. |
| 9,142,889 | B2 | 9/2015 | Pazin et al. |
| 9,214,739 | B2 | 12/2015 | Sover et al. |
| 9,225,058 | B2 | 12/2015 | DeVries et al. |
| 9,337,542 | B2 | 5/2016 | Coburn et al. |
| 9,397,740 | B2 * | 7/2016 | Maltsev ................... H01Q 3/40 |
| 2005/0225481 | A1 | 10/2005 | Bonthron |
| 2006/0044189 | A1 | 3/2006 | Livingston et al. |
| 2007/0195004 | A1 * | 8/2007 | Rebeiz ................. H01Q 1/3233 343/876 |
| 2012/0194377 | A1 | 8/2012 | Yukumatsu et al. |
| 2012/0235881 | A1 | 9/2012 | Pan et al. |
| 2012/0295015 | A1 | 11/2012 | Yang |
| 2013/0076579 | A1 | 3/2013 | Zhang et al. |
| 2013/0201076 | A1 | 8/2013 | Vos et al. |
| 2014/0070994 | A1 | 3/2014 | Schmalenberg et al. |
| 2014/0266902 | A1 | 9/2014 | Kamgaing et al. |
| 2015/0070228 | A1 | 3/2015 | Gu et al. |
| 2015/0130673 | A1 | 5/2015 | Ng et al. |
| 2015/0268336 | A1 | 9/2015 | Yukumatsu et al. |
| 2016/0033638 | A1 | 2/2016 | Silc |
| 2016/0125713 | A1 | 5/2016 | Blech et al. |

FOREIGN PATENT DOCUMENTS

| | | |
|---|---|---|
| WO | WO 01/52352 | 7/2001 |
| WO | WO 2009092695 | 7/2009 |
| WO | WO2012076994 | 6/2012 |
| WO | WO2014184554 | 11/2014 |

OTHER PUBLICATIONS

Djerafi, et al.; "Innovative Multilayered Millemetre-Wave Antennas for Multi-Dimensional Scanning and Very Small Footprint Applications"; *6th European Conference on Antennas and Propagation (EUCAP)*; pp. 2583-2587; Mar. 26, 2012.

Tahim et al.; "Multi-Band Antenna Technology;" *Antennas and Propagation Society International Symposium, 2004. IEEE*; vol. 4; pp. 3968-3971; Jun. 20, 2004.

Ranade, et al.; "Design of a Substrate Integrated Waveguide H Plane Horn Antenna on a PTFE Substrate for Automotive Radar Application;" *Applied Electromagnetics Conference (AEMC), 2011 IEEE*; 4 pages; Dec. 18, 2011.

Beer et al.; "Novel Antenna Concept for Compact Millimeter-Wave Automotive Radar Sensors;" *IEEE Antennas and Wireless Propagation Letters*; vol. 8; pp. 771-774; Jul. 7, 2009.

Choukiker et al.; "Hybrid Fractal Shape Planar Monopole Antenna Covering Multiband Wireless Communication with MIMO Implementation for Handheld Mobile Devices;" *IEEE Transactions on Antennas and Propagation*; vol. 62; No. 3; pp. 1483-1488; Dec. 17, 2013.

Li et al.; "A Compact Wideband MIMO Antenna with Two Novel Bent Slits;" *IEEE Transactions on Antennas and Propagation*; vol. 60; No. 2; pp. 482-489; Feb. 2012.

Yang; "Dual Band-Notched Ultrawideband MIMO Antenna Array;" *Wireless Symposium (IWS), 2013 IEEE International*; 4 pages; Apr. 18, 2013.

Shamsinejad et al.; "Microstrip-Fed 3-D Folded Slot Antenna on Cubic Structure;" *IEEE Antennas and Wireless Propagation Letters*; vol. 15; pp. 1081-1084; 2016.

Li, Yuan; "Development of Micromachined Millimeter Wave Modules for Wireless Communication Systems;" Georgia Institute of Technology; 128 pages; Aug. 2010.

Bisognin et al.; "3D Printed Plastic 60 GHz Lens: Enabling Innovative Millimeter Wave antenna Solution and System;" *2014 IEEE MTT-S International Microwave Symposium (IMS2014)*; 4 pages; Jun. 1, 2014.

Jansen et al.; "Antenna Design for 24 GHz and 60 GHz Emerging Microwave Applications;" *Koninklijke Philips Electronics N.V. 2006*; 137 pages; Jul. 2006.

Dhiman et al.; "Effect of DGS Technique in MIMO Antenna;" *International Journal of Current Engineering and Technology*; vol.; No. 5; pp. 3138-3141; Oct. 2015.

Schwering, Felix K.; "Millimeter Wave Antennas;" *Proceedings of the IEEE*; vol. 80; No. 1; pp. 92-102; Jan. 1992.

Yuan, Z.-X. et al.; "Multiband Printed and Double-Sided Dipole Antenna for WLAN/WiMAX Applications"; Microwave and Optical Technology Letters, vol. 54, No. 4, Apr. 2012; (4 pages).

Harvey et al. "Spatial Power Combining for High-Power Transmitters" *IEEE Microwave*; pp. 48-59; Dec. 2000.

Larumbe-Gonzalo et al. "Coherently Fed Frequency Scanning Phased Array Structure for Imaging Applications" IEEE $6^{th}$ European Conference on Antennas and Propagation (EUCAP); pp. 2802-2806; 2011.

Li et al. "Dual-Beam Steering Microstrip Leaky Wave Antenna with Fixed Operating Frequency" *IEEE Transactions on Antennas and Propagation*; vol. 56, No. 1; pp. 248-252; Jan. 2008.

(56) References Cited

OTHER PUBLICATIONS

Ramadurgakar, Ameya "X Band Substrate Integrated Horn Array Antenna for Future Advanced Collison Avoidance System" Drexel University; 133 pages; 2011.
Ye et al.; "A Dual-Band Printed End-Fire antenna with DSPSL Feeding" 6 pages; Dec. 17, 2015.
Amadjikpè "Integrated 60-GHz Antenna on Multilayer Organic Package with Broadside and End-Fire Radiation" *IEEE Transactions on Microwave Theory and Techniques*, vol. 61, No. 1, pp. 303-315; Jan. 2013.
Litzenberger et al.; "Study of Waveguide Antenna Implemented in Laminated Material" Dec. 2002.
Schoenlinner, Bernhard "Compact Wide Scan-Angle Antennas for Automotive Applications and RF MEMS Switchable Frequency-Selective Surfaces" 2014.

\* cited by examiner

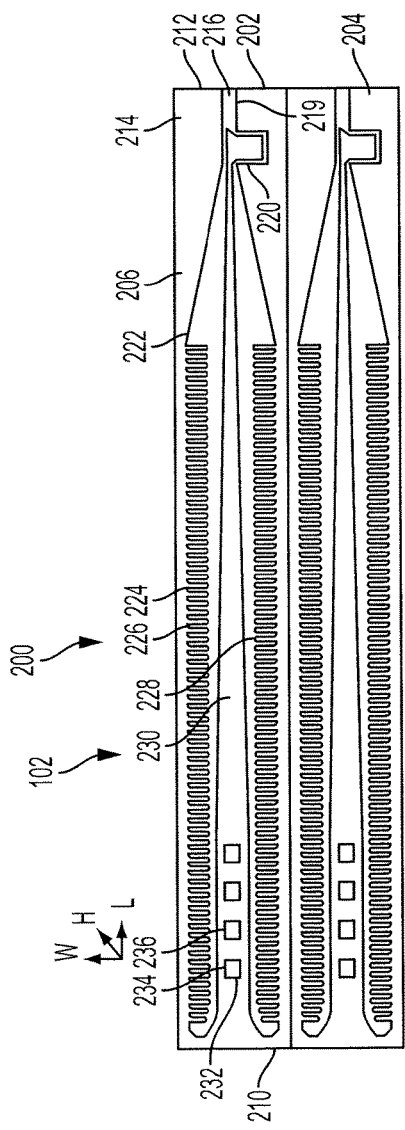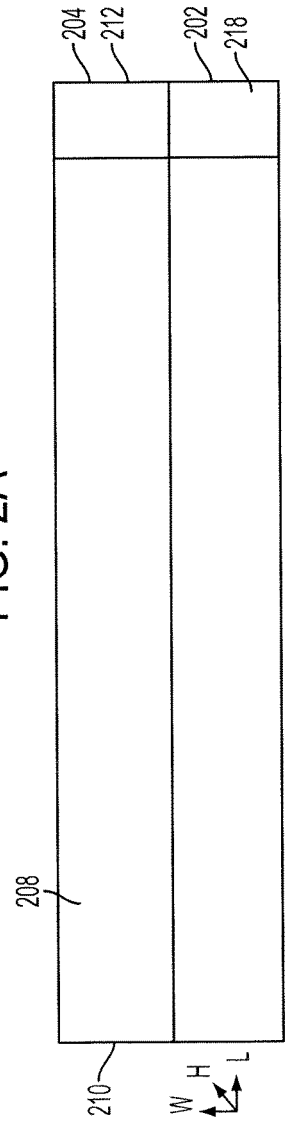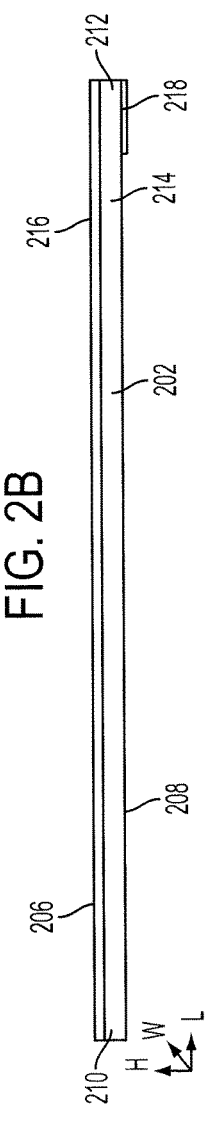
FIG. 2A
FIG. 2B
FIG. 2C

COMPACT VOLUME SCAN END-FIRE RADAR FOR VEHICLE APPLICATIONS

BACKGROUND

1. Field

The present disclosure relates to vehicular radar systems and, in particular, to vehicular radar systems that include end-fire antennas arranged so they can transmit and receive three-dimensional radar beams.

2. Description of the Related Art

Autonomous and semi-autonomous vehicle functions are increasing in popularity. For example, some vehicle manufacturers are currently designing fully autonomous and semi-autonomous vehicles that can drive themselves from a starting location to a destination location. Some other vehicles include collision avoidance features that may warn a driver and/or control operations of a vehicle when detected data indicates that the vehicle may collide with another object. Algorithms for these autonomous and semi-autonomous vehicle features are based on detection of objects in the vicinity of the vehicle, such as street signs, other vehicles, people, and the like.

Many vehicles incorporate radar systems to detect such objects. Vehicular radar systems transmit a radar signal having a frequency of about 80 gigahertz (GHz) through the air. The radar signal is reflected from a target and the reflected signals or waves are then received by the vehicular radar system. The characteristics of the reflected signals are analyzed by a processor or a controller to determine characteristics of the objects that reflected the signal, such as a size of the object, a distance between the object and the vehicle, or the like.

Conventional vehicular radar systems utilize an array of broadside antennas typically printed on a printed circuit board (PCB). Signals transmitted by these broadside antennas propagate in a direction perpendicular to a plane of the PCB. This layout provides for two-dimensional scanning in the direction perpendicular to the plane of the PCB.

Challenges arise, however, when attempting to stack broadside antennas on top of each other. In particular, difficulties arise when attempting to electrically connect an antenna controller to each broadside antenna of stacked arrays of broadside antennas. In order to electrically connect the antenna controller to each broadside antenna, a relatively large area is required for the antennas and connections. This large required area precludes stacked arrays of broadside antennas from having a compact size that is suitable for consumer vehicle use.

Another challenge with stacking broadside antennas is signal interference. For example, a first broadside antenna may be stacked above a second broadside antenna. Because the second broadside antenna transmits a signal in the direction perpendicular to the plane of the PCB, the signal is directed towards the first broadside antenna. The first broadside antenna interferes with the signal from the second broadside antenna, presenting difficulties when processing the signals.

Thus, there is a need for systems and methods for providing volumetric scanning by vehicular radar systems.

SUMMARY

Described herein is a vehicular radar system for providing a volumetric scan of an environment of a vehicle. The vehicular radar system includes a first antenna array that has two or more tapered slot end-fire antennas positioned adjacent to each other in a direction parallel to an axis. The vehicular radar system also includes a second antenna array that has two or more tapered slot end-fire antennas positioned adjacent to each other in the direction parallel to the axis. The two or more tapered slot end-fire antennas of the second antenna array are also positioned adjacent to the two or more tapered slot end-fire antennas of the first antenna array in a direction orthogonal to the axis such that the first antenna array is stacked above the second antenna array. The vehicular radar system also includes a radio frequency integrated circuit (RFIC) coupled to the first antenna array and the second antenna array. The RFIC is designed to control at least some of the two or more tapered slot end-fire antennas of the first antenna array and the two or more tapered slot end-fire antennas of the second antenna array to transmit a signal. At least some of the signals from the first antenna array and from the second antenna array may have different phases such that they may be combined to form a three-dimensional radar beam.

Also described is a vehicular radar system for providing a volumetric scan of an environment of a vehicle. The vehicular radar system includes a first antenna array having two or more tapered slot end-fire antennas positioned adjacent to each other in a direction parallel to an axis. The vehicular radar system also includes a second antenna array having two or more tapered slot end-fire antennas positioned adjacent to each other in the direction parallel to the axis. The two or more tapered slot end-fire antennas of the second antenna array are positioned adjacent to the two or more tapered slot end-fire antennas of the first antenna array in a direction orthogonal to the axis such that the first antenna array is stacked above the second antenna array. The vehicular radar system also includes a first radio frequency integrated circuit (RFIC) coupled to the first antenna array. The first RFIC is designed to control each of the two or more tapered slot end-fire antennas of the first antenna array to transmit a signal. At least some of the signals from each antenna of the first antenna array may have different phases such that they may be combined to form a first radar beam for radar scanning. The vehicular radar system also includes a second RFIC coupled to the second antenna array and designed to control each of the two or more tapered slot end-fire antennas of the second antenna array to transmit a signal. At least some of the signals from each antenna of the second antenna array may have different phases such that they may be combined to form a second radar beam for radar scanning. The first radar beam and the second radar beam may be combined to provide a volumetric, or three-dimensional, radar beam.

Also described is a vehicular radar system for providing a volumetric scan of an environment of a vehicle. The vehicular radar system includes a metal antenna array having an outer surface. The metal antenna array defines a first plurality of horn antennas positioned adjacent to each other in a first direction and a second plurality of horn antennas positioned adjacent to the first plurality of horn antennas in a second direction that is perpendicular to the first direction. Each of the first plurality of horn antennas and each of the second plurality of horn antennas has a transmission end and a chip connection aperture that is defined by the outer surface. The vehicular radar system also includes a printed circuit board (PCB) mechanically coupled to the outer surface of the metal antenna array. The vehicular radar system also includes a radio frequency integrated circuit (RFIC) coupled to the PCB and designed to transmit a signal to each of the first plurality of horn antennas and each of the second plurality of horn antennas. At least some of the signals from each of the first plurality of horn antennas and each of the second plurality of horn antennas may have different phases such that they may be combined to form one or more radar beam. The vehicular radar system also includes a plurality of metal traces each positioned on the PCB. Each of the plurality of metal traces connects the RFIC to the chip connection aperture of at least one of the first plurality of horn antennas or at least one of the second plurality of horn antennas. The RFIC can transmit a signal to a desired antenna via a corresponding metal trace.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 2A is a drawing showing a top view of two end-fire antennas of an end-fire antenna array according to an embodiment of the present invention;

FIG. 2B is a drawing showing a bottom view of the end-fire antenna array of FIG. 2A according to an embodiment of the present invention;

FIG. 2C is a drawing showing a side view of the end-fire antenna array of FIG. 2A according to an embodiment of the present invention;

DETAILED DESCRIPTION

The present invention provides antenna structures that can provide volumetric radar scanning by a radar device usable in a vehicle. That is, the antenna structures described herein can be controlled to output a three-dimensional radar beam that can be used to provide three-dimensional information regarding the environment of the vehicle. A radio frequency integrated circuit (RFIC) is connected to the antenna structures and controls the signals transmitted by each of the antennas so that the signals combine to form a desired three-dimensional radar beam. These antenna structures and radar devices can be used in most vehicles including autonomous and semi-autonomous vehicles.

The antennas structures described herein include end-fire antennas that transmit signals outward from a longitudinal end of each antenna. Because signals are transmitted from longitudinal ends of the antennas, they may be placed adjacent to each other in two directions without interfering with signals of adjacent antennas. This two-dimensional arrangement of antennas allows the group of antennas to transmit a three-dimensional radar beam. The structure of the different antennas described herein allows the RFIC to electronically connect to each antenna without requiring a large amount of space. Because the antennas and all connections are packaged in a relatively small area, they can fit within existing vehicle radar compartments without substantive changes to the size of the vehicle compartments.

The antenna structures provide several benefits and advantages such as allowing transmission of a three-dimensional radar beam, which in turn provides a relatively large amount of detail regarding objects in the environment of the vehicle. The structure of the antennas and connections between antennas provides the benefit and advantage of allowing the entire radar system to be implemented in a relatively small package such that it can be included in a vehicle. The structure of the antennas and connections between antennas provides the benefit and advantage of allowing each antenna of the radar system to be controlled by a single RFIC. Control of the antennas by a single RFIC provides benefits and advantages such as further reducing the size of the radar system and providing for a relatively high quality of volumetric scanning because signal loss between controllers will not occur.

Figure 1:
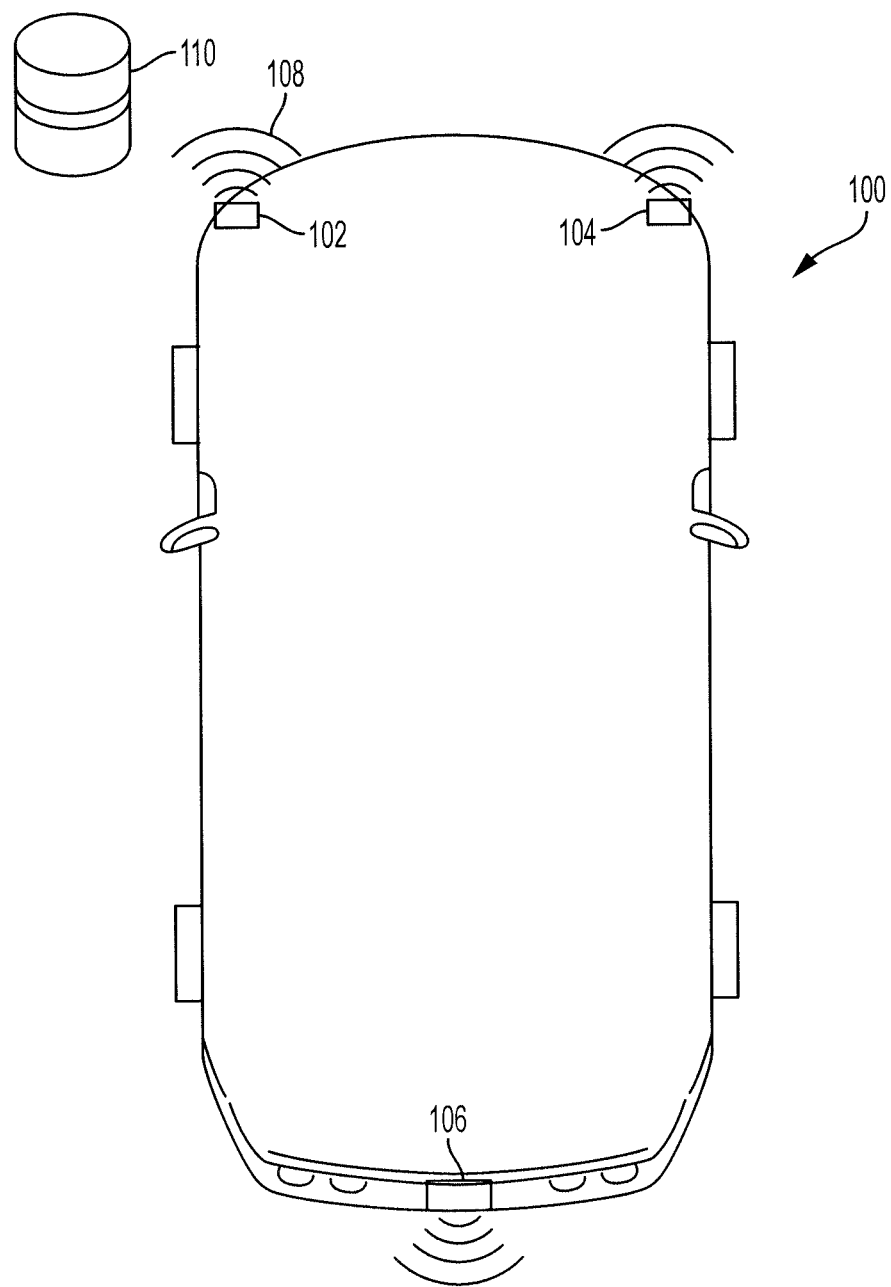
FIG. 1 is a drawing of a vehicle having multiple vehicular radar systems for sensing objects in an environment of the vehicle according to an embodiment of the present invention.

Turning to FIG. 1, a vehicle 100 having radar sensing capabilities is shown. The vehicle 100 includes a first vehicular radar system 102, a second vehicular radar system 104, and a third vehicular radar system 106. Each of the vehicular radar systems 102, 104, 106 may determine the location and characteristics of objects around the vehicle 100. For example, the vehicular radar system 102 may transmit a signal or a beam 108. The beam 108 may reflect off of an object 110 and propagate back towards the vehicular radar system 102. The vehicular radar system 102 may receive the reflected signal and determine a location and characteristics of the object 110 based on the received reflected signal.

Turning to FIGS. 2A, 2B, and 2C, a top view, a bottom view, and a side view, respectively, of an end-fire antenna array 200 are shown. The end-fire antenna array 200 may be included in the vehicular radar system 102. An L-W-H axis is shown in various drawings to illustrate directions corresponding to a length, a width, and a height of the vehicular radar system 102. Although features are described with reference to the length, the width, and the height, one skilled in the art will realize that the vehicular radar system 102 may be oriented in any direction such that, for example, a height may be referred to as a length and so forth.

The end-fire antenna array 200 has a plurality of end-fire antennas including a first end-fire antenna 202 and a second end-fire antenna 204. In some embodiments, the antenna array 200 may include between 2 and 32 antennas.

The antenna array 200, and thus the first antenna 202 and the second antenna 204, has a top 206 and a bottom 208. The terms top and bottom are used for reference only. One skilled in the art will realize that the top 206 and the bottom 208 of the antenna array 200 may be oriented in any direction.

The antenna array 200 also includes a transmission end 210 and a chip connection end 212. A signal from a controller, such as a RFIC designed to transmit signals in a radio frequency, may be received by the first antenna 202 at the chip connection end 212. The signal may propagate through the first antenna 202 towards the transmission end 210. From the transmission end, the signal may be wirelessly transmitted in the longitudinal direction (i.e., in the negative L direction).

Similarly, a wireless signal (such as a signal reflected off of an object) may be received by the first antenna 202 at the transmission end 210 and may propagate through the first antenna 202 to the chip connection end 212. The signal may then be received by the controller and analyzed by the controller to determine features of the object from which it was reflected.

The first antenna 202 may include a metal 216 inside of or on a PCB 214. The metal 216 may include tin, gold, nickel, any other conductive metal, or any combination thereof. The metal 216 on the bottom 208 of the first antenna 202 may form a ground structure 218. The ground structure 218 may be electrically isolated from the metal 216 on the top 206 of the first antenna 202 and may be connected to an electrical ground.

The metal 216 on the top 206 of the first antenna 202 may form an antenna structure including a chip connection lead 219, a balun 220, a tapered section 222, and a wave section 224. In some embodiments, the metal 216 on the top 206 of the first antenna 202 may also form one or more beam adjustment feature 232 including a first beam adjustment feature 234 and a second beam adjustment feature 236. The first antenna 202 and the second antenna 204 may each be referred to as a tapered slot and fire antennas.

The chip connection lead 219 may be electronically connected to a controller, such as an RFIC, that controls operation of the antenna array 200.

The balun 220 may function as a transformer and convert an unbalanced signal to a balanced signal and/or may convert a balanced signal to an unbalanced signal.

The tapered section 222 is tapered from the wave section 224 to the balun 220. The converted signal may propagate through the tapered section 222 towards the wave section 224.

The wave section 224 may include a first wave section 226 and a second wave section 228 separated by a space 230. The design of the wave section 224 allows the signal propagating towards the transmission end 210 to continue to propagate beyond the wave section 224 in a wireless manner.

The beam adjustment features 232 may be included or adjusted to alter characteristics of a signal transmitted by the first antenna 202. The beam adjustment features 232 may be positioned within the space 230. The beam adjustment features 232 may have any shape such as the square shape that is shown, a triangular shape, a parallelogram shape, or the like. The beam adjustment features 232 may be electrically isolated from the other metal 216 on the top 206 of the first antenna 202 or may be in electrical contact with the other metal 216.

Figure 2D:
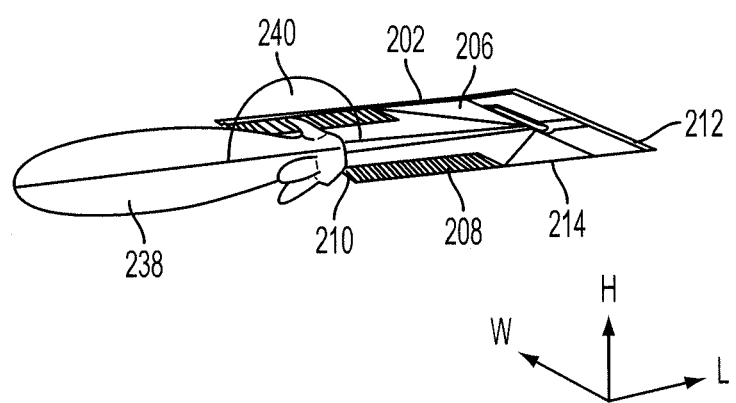
FIG. 2D is a drawing illustrating a shape of a radar beam transmitted by one of the end-fire antennas of FIG. 2A according to an embodiment of the present invention.

Turning to FIG. 2D, the first antenna 202 functions as an end-fire antenna because it transmits a signal or a beam 238 that propagates in a direction parallel to a longitudinal direction of the first antenna 202 (i.e., in the negative L direction). This is distinguished from a signal transmitted by a broadside antenna that propagates perpendicular to a longitudinal direction of an antenna (i.e., in the positive H direction).

Referring to FIGS. 2A and 2D, the beam adjustment features 232 may be varied to adjust characteristics of the beam 238. For example, a quantity of the beam adjustment features 232, a shape of the beam adjustment features 232, and/or dimensions of the beam adjustment features 232 may be selected to achieve desirable characteristics of the beam 238. In some embodiments, the quantity, the shape, and/or the dimensions of the beam adjustment features 232 may be selected in order for the beam 238 to form a desired angle 240 with the top 206 or the bottom 208 of the PCB 214.

Returning reference to FIGS. 2A, 2B, and 2C, bandwidths for automotive radar systems may be about 80 gigahertz (GHz), such as between 77 GHz and 79 GHz. Where used in this context, "about" refers to the referenced value plus or minus seven percent (7%). The end-fire antennas, including tapered slot end-fire antennas and horn end-fire antennas (described below with reference to FIGS. 6-9), provide desirable characteristics at these bandwidths. The end-fire antennas may be positioned adjacent to each other, as shown in FIG. 2A, in order to form a beam that scans in two dimensions. Furthermore, because the signal propagates away from the antenna in the longitudinal direction, the end-fire antennas may be stacked on top of each other, allowing for a volumetric (three-dimensional) scan.

In order to obtain desirable antenna properties of signals having bandwidths in the automotive spectrum, the substrate of the antenna array 200 (i.e., the PCB 214) may be relatively thin. For example, the first antenna 202 (including the PCB 214) may have a height of 0.127 mm in the H direction, a width of 2.5 mm in the W direction, and a length of 10 mm to 30 mm in the L direction.

Figure 3:
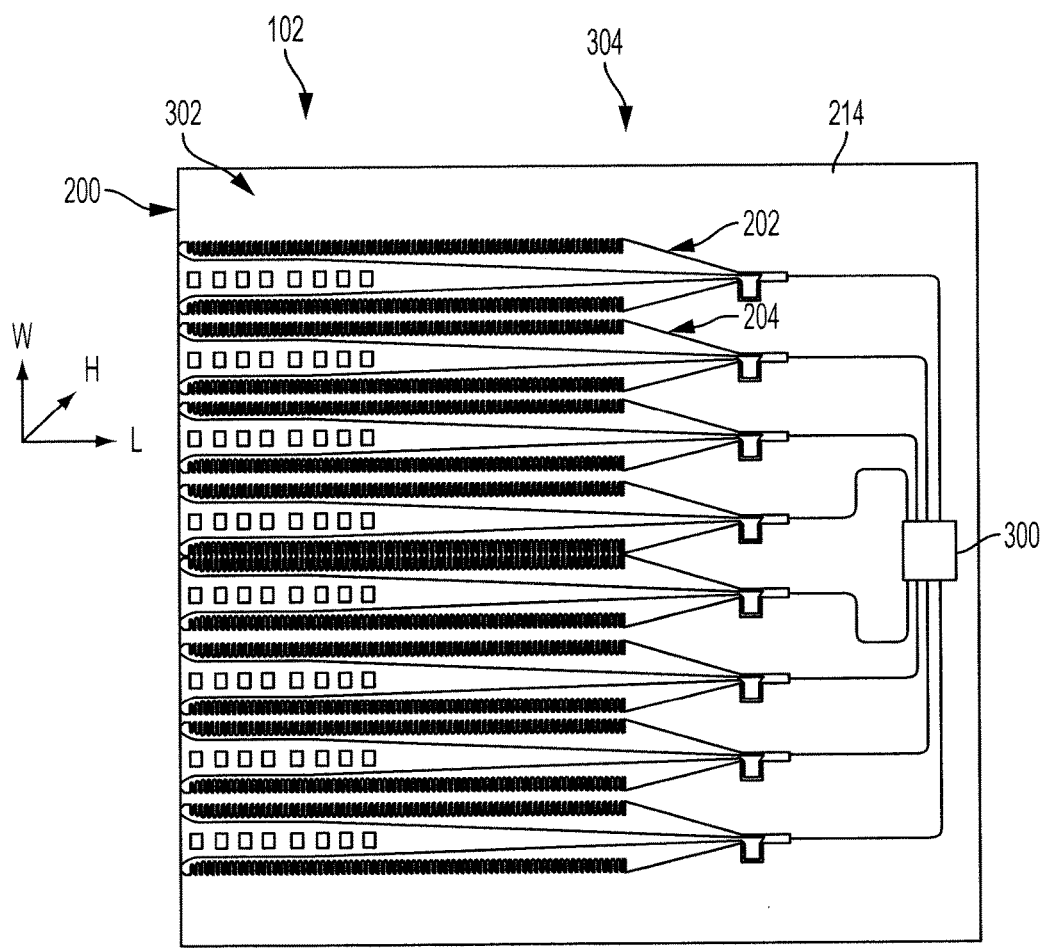
FIG. 3 is a drawing illustrating a two-dimensional radar board having the end-fire antenna array of FIG. 2A and a radio frequency integrated circuit (RFIC) coupled to the end-fire antenna array according to an embodiment of the present invention.

Turning now to FIG. 3, the vehicular radar system 102 may include a two-dimensional radar board 304. The two-dimensional radar board 304 may include the end-fire antenna array 200 that includes a plurality of end-fire antennas 302. The two-dimensional radar board 304 may also include an RFIC 300. The RFIC 300 may be connected to each of the plurality of end-fire antennas 302 of the end-fire antenna array 200. The RFIC 300 may control operation of each of the plurality of end-fire antennas 302. For example, the RFIC 300 may transmit a signal to each antenna of the plurality of end-fire antennas 302, which in turn may be wirelessly transmitted by the corresponding antenna.

The RFIC 300 may control the plurality of end-fire antennas 302 to transmit one or more radar beam. For example, at least some of the signals transmitted by the RFIC 300 to each of the plurality of end-fire antennas 302 may have a different phase. When the signals have a different phase and are transmitted into the atmosphere, the combined signals form a radar beam.

When the beam reaches an object away from the two-dimensional radar board 304, the beam may reflect from the object and travel towards the two-dimensional radar board 304. The reflected beam may be received by the end-fire antennas 302 and/or other end-fire antennas and may be transmitted from the antennas to the RFIC 300. The RFIC 300 may analyze the received beam that was reflected from the object and determined characteristics of the object based on the reflected beam.

Because the antennas 302 of the two-dimensional radar board 304 are positioned in a linear manner with respect to each other, the two-dimensional radar board 304 may scan in two dimensions. When two or more two-dimensional radar boards are stacked such that antennas are positioned in two directions with respect to each other, the radar boards may together scan in three dimensions.

Figure 4A:
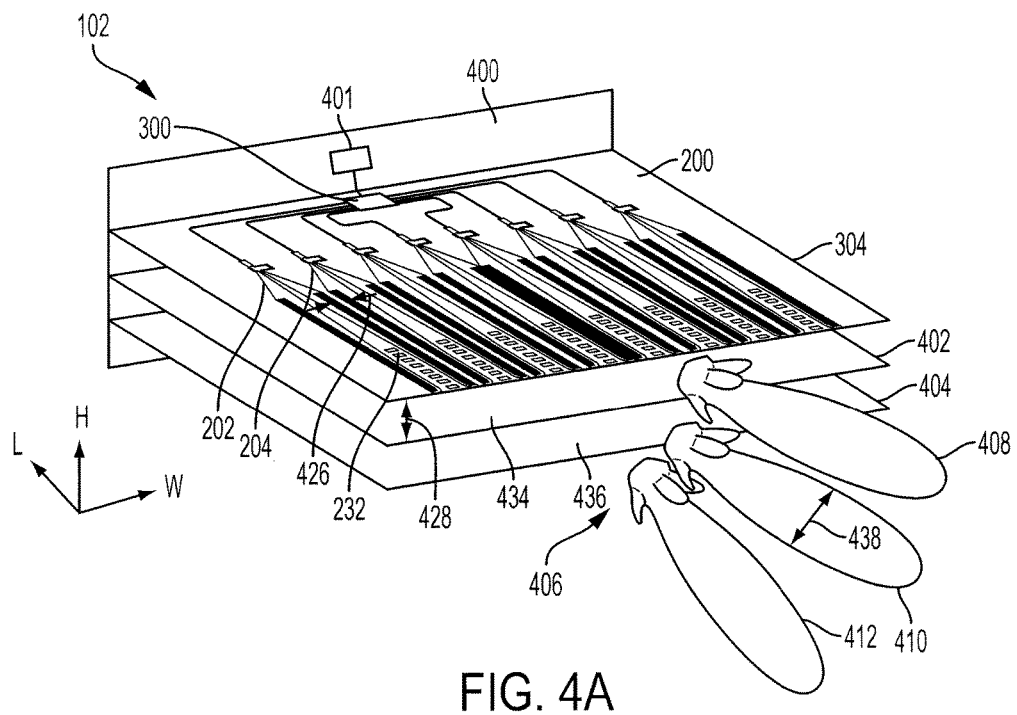
FIG. 4A is a perspective view of one of the vehicular radar systems of FIG. 1 including the two-dimensional radar board of FIG. 3 along with two additional two-dimensional radar boards all coupled to a main RFIC via a backplane according to an embodiment of the present invention.
Figure 4B:
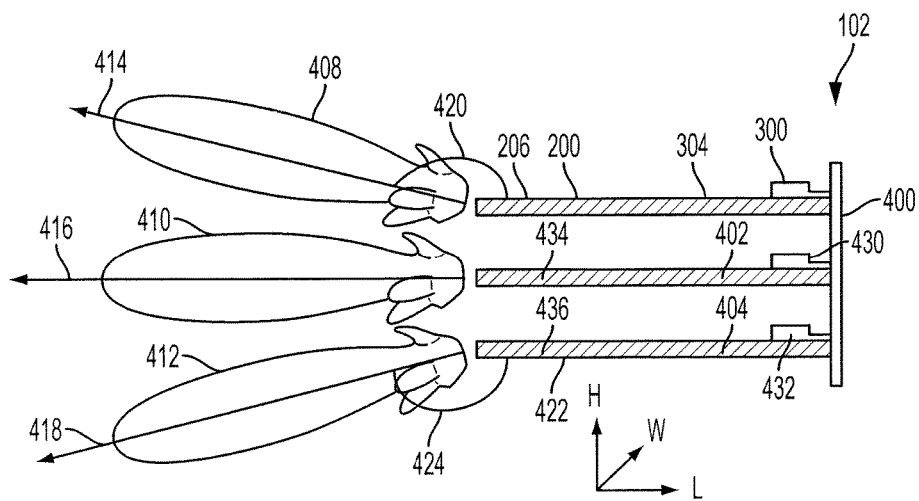
FIG. 4B is a cross-sectional view of the vehicular radar system of FIG. 4A according to an embodiment of the present invention.

Turning to FIGS. 4A and 4B, the vehicular radar system 102 may include multiple two-dimensional radar boards including the first two-dimensional radar board 304, a second two-dimensional radar board 402, and a third two-dimensional radar board 404. The vehicular radar system 102 may also include a backplane 301 connected to each of the first two-dimensional radar board 304, the second two-dimensional radar board 402, and the third two-dimensional radar board 404.

As discussed above, the first two-dimensional radar board 304 includes the first antenna array 200 and the first RFIC 300. Likewise, the second two-dimensional radar board 402 includes a second antenna array 434 and a second RFIC 430. The third two-dimensional radar board 404 also includes a third antenna array 436 and a third RFIC 432.

The backplane 400 may also include a main RFIC 401. The main RFIC 401 may communicate with the first RFIC 300 of the first two-dimensional radar board, the second RFIC 430 of the second two-dimensional radar board 402, and the third RFIC 432 of the third two-dimensional radar board 404 via the backplane 400. The main RFIC 401 of the backplane 400 may control the RFICs 300, 430, 432 of the two-dimensional radar boards 304, 402, 404 to transmit a desired signal via their corresponding antenna arrays 200, 434, 436.

By controlling each antenna of each antenna array 200, 434, 436 to have one or more different phases, the vehicular radar system 102 may transmit one or more beams 406. In some embodiments, each of the two-dimensional radar boards 304, 402, 404 may transmit a two-dimensional beam. For example, the main RFIC 401 may control the first RFIC 300 to instruct each antenna of the first antenna array 200 to output signals having different phases, such that the first two-dimensional radar board 304 outputs a first beam 408. Likewise, the main RFIC 401 may control the second RFIC 430 to instruct each antenna of the second antenna array 434 to output signals having different phases, such that the second two-dimensional radar board 402 outputs a second beam 410. Similarly, the main RFIC 401 may control the third RFIC 432 to instruct each antenna of the third antenna array 436 to output signals having different phases, such that the third two-dimensional radar board 404 outputs a third beam 412.

The first beam 408, the second beam 410, and the third beam 412 may together represent a three-dimensional radar beam. The three-dimensional radar beam may be reflected off of an object and received by the antenna arrays 200, 434, 436, and/or other antenna arrays of the vehicular radar system 102. The received reflected beam may be transmitted via the antenna arrays and corresponding RFICs to the main RFIC 401. The main RFIC 401 may determine three-dimensional data corresponding to the object based on the received reflected radar beam.

Various features of the vehicular radar system 102 may be adjusted to vary characteristics of the beams 408, 410, 412. As described above, the beam adjustment features 232 of each antenna of the vehicular radar system 102 may be selected to provide desirable beam characteristics. For example, the quantity, the shape, and/or the size of the beam adjustment features 232 may be varied such that a beam direction 414 of the first beam 408 forms a desired angle 420 with the top 206 of the first antenna array 200. Similarly, beam adjustment features of the third antenna array 436 may be varied such that a direction 418 of the third beam 412 forms a desired angle 424 with a bottom 422 of the third antenna array 436. Thus, the beam adjustment features may be used to adjust the beam directions 414, 416, 418 of the beams 408, 410, 412 in the H direction. That is, the beam directions 414, 416, 418 of the beams 408, 410, 412 may be rotated about the W axis by varying the beam adjustment features. The beam direction 414, 416, 416 of each beam 408, 410, 412 may be referred to as "steering."

In some embodiments, the beam directions 414, 416, 418 of the beams 408, 410, 412 in the W direction may be adjusted by varying the beam adjustment features. That is, the beam directions 414, 416, 418 of the beams 408, 410, 412 may be rotated about the H axis by varying the beam adjustment features. In some embodiments, a size of a beam, such as a beam width 438 of the second beam 410 and/or a shape of the second beam 410, may be adjusted by varying the beam adjustment features of the second antenna array 434. The beam width 438 may indicate a distance of the beam in any direction along the H-W plane.

Likewise, the main RFIC 401 and/or the first RFIC 300 may adjust characteristics of the beams 408, 410, 412 by adjusting the phase of each antenna of the corresponding antenna array. For example, the main RFIC 401 and/or the first RFIC 300 may adjust the beam direction 414 of the first beam 408 in the H direction and/or in the W direction by adjusting the phase of each antenna of the antenna array 200. In some embodiments, the main RFIC 401 and/or the second RFIC 430 may adjust the beam width 438, a size, or a shape of the second beam 410 by adjusting the phase of each antenna of the second antenna array 434.

The main RFIC 401 and/or the first RFIC 300 may adjust the distance that the first beam 408 travels in the L direction by adjusting a magnitude of the signals transmitted to the first antenna array 200. For example, the first RFIC 300 may transmit signals having a higher magnitude to increase the distance that the first beam 408 travels in the negative L direction.

Characteristics of the beams 408, 410, 412 may also be adjusted by selecting a distance between antennas of each antenna array and/or by selecting a distance between each antenna array. For example, a distance 426 between antennas on the first antenna array 200 may be selected such that the first beam 408 has a desired size, shape, and/or direction 414. In particular, the distance 426 may be selected to achieve a desired beam direction 414 of the first beam 408 in the W direction. Likewise, a distance 428 between the first antenna array 200 and the second antenna array 434 may be selected such that the first beam 408 and/or the second beam 410 has a desired size, shape, and/or direction. In particular, the distance 428 may be selected to achieve a desired beam direction 414 of the first beam 408 and/or a desired direction 416 of the second beam 410 in the L direction.

In some embodiments, the main RFIC 401 may be replaced by another processor or controller. In that regard the other processor or controller may still provide instructions to the RFICs 300, 430, 432 to generate radar beams. For example, the other processor or controller may generally request that a signal be distributed and the RFICs 300, 430, 432 may generate signals based on the request and/or may transmit information regarding an object to the other processor or controller.

In some embodiments, the main RFIC 401 may not exist and one or more of the RFIC 300, 430, 432 may perform the functions of the main RFIC 401. In some embodiments, the main RFIC 401 may control the RFICs 300, 430, 432 to transmit signals such that a single beam is formed from the combination of signals from each of the two-dimensional radar boards 304, 402, 404 instead of one beam from each of the two-dimensional radar boards 304, 402, 404.

Figure 5A:
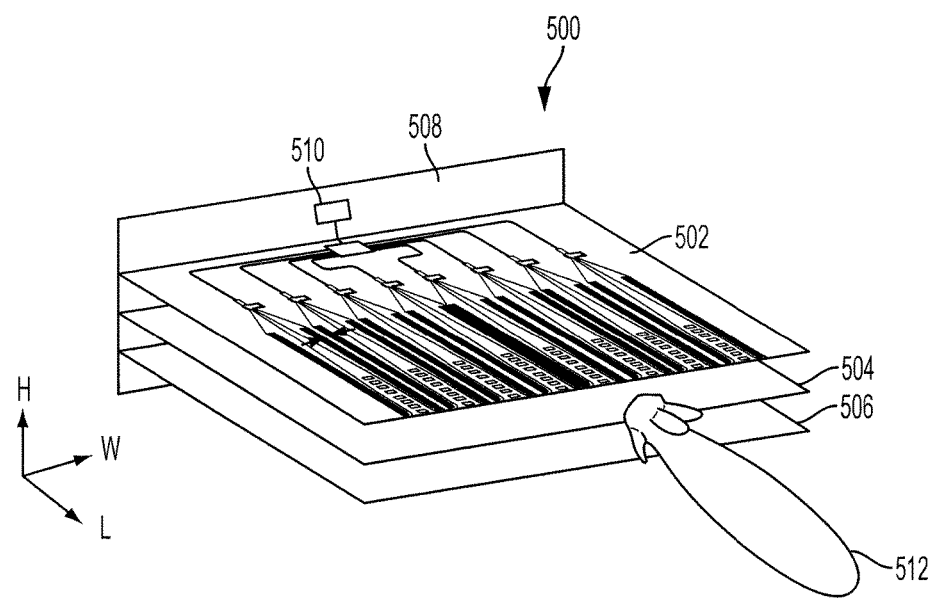
FIG. 5A is a perspective view of a vehicular radar system having three pluralities of antenna arrays each coupled to a main RFIC via a backplane according to an embodiment of the present invention.
Figure 5B:
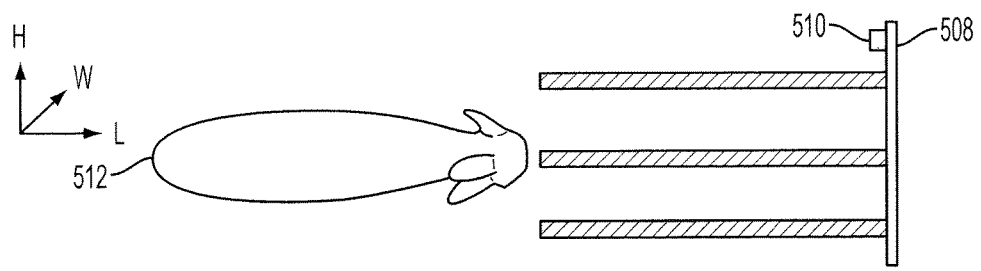
FIG. 5B is a cross-sectional view of the vehicular radar system of FIG. 5A according to an embodiment of the present invention.

Referring to FIGS. 5A and 5B, another vehicular radar system 500 includes multiple antenna arrays coupled to a backplane 508. In particular, the vehicular radar system 500 includes a first antenna array 502, a second antenna array 504, and a third antenna array 506. The vehicular radar system 500 also includes a RFIC 510 coupled to the antenna arrays via the backplane 508. With brief reference to FIGS. 4A and 5A, the vehicular radar system 500 differs from the vehicular radar system 102 because each antenna array 502, 504, 506 of the vehicular radar system 500 is not coupled to a separate RFIC.

Returning reference to FIGS. 5A and 5B, the RFIC 510 may control each antenna of the first antenna array 502, the second antenna array 504, and the third antenna array 506 to transmit a signal. The RFIC 510 may cause at least some of the signals transmitted by the antenna arrays 502, 504, 506 to have different phases. In that regard, the signals transmitted by each of the antennas may form a three-dimensional beam 512. In some embodiments, the RFIC 510 may control the antennas such that the first antenna array 502 transmits a first two-dimensional beam, the second antenna array 504 transmits a second two-dimensional beam, and the third antenna array 506 transmits a third two-dimensional beam.

As with the vehicular radar system 102 of FIG. 4A, characteristics of the vehicular radar system of 500 may be varied to adjust characteristics of the beam 512. For example, the quantity and the size of the beam adjustment features of each antenna may be varied, a distance between each antenna may be varied, and/or a distance between antenna arrays may be varied to achieve a desirable size, shape, and/or direction of the beam 512. Similarly, the RFIC 510 may control the phase of each signal transmitted to the antennas to further adjust the size, shape, and/or direction of the beam 512.

Figure 6:
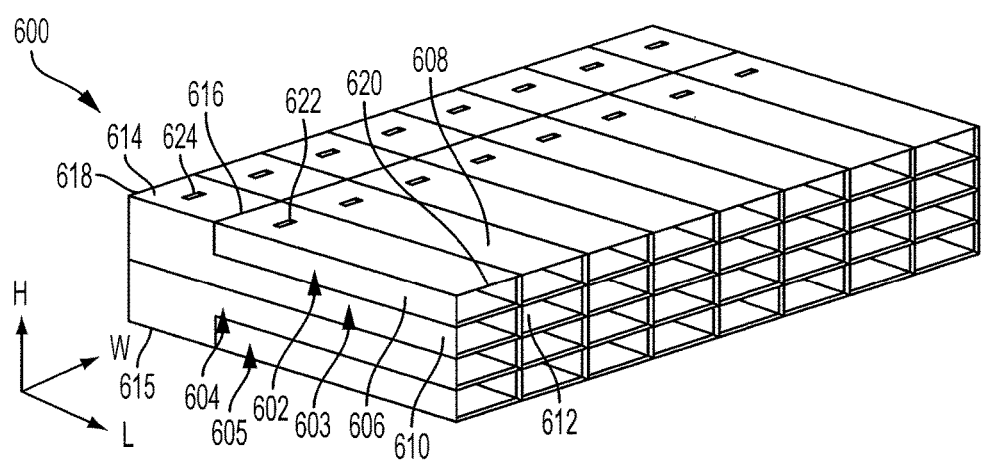
FIG. 6 is a perspective view of a metal antenna array having a plurality of horn end-fire antennas arranged in two directions relative to each other according to an embodiment of the present invention.

Turning now to FIG. 6, the end-fire antenna characteristics may also be achieved using a metal antenna array 600. The metal antenna array 600 may be formed using any metal such as copper, aluminum, tin, or the like. The metal antenna array 600 may include one or more plurality of horn antennas. In particular, the metal antenna array 600 includes a first plurality of horn antennas 602, a second plurality of horn antennas 603, a third plurality of horn antennas 604, and a fourth plurality of horn antennas 605. As will be discussed below with reference to FIG. 7, each horn antenna of the metal antenna array 600 may include a conical cavity defined by the metal of the metal antenna array 600. The name "horn antenna" stems from the fact that the cavity of the antennas resembles a horn.

Each of the plurality of horn antennas 602, 603, 604, 605 may include two or more horn antennas positioned adjacent to each other in the W direction. For example, the first plurality of horn antennas 602 includes a first horn antenna 606 and a second horn antenna 608 positioned adjacent to each other in the W direction. Similarly, the second plurality of horn antennas 603 includes a third horn antenna 610 and a fourth horn antennas 612 positioned adjacent to each other in the W direction. Thus, each of the plurality of horn antennas 602, 603, 604, 605 may transmit a two-dimensional radar beam.

Each of the plurality of horn antennas 602, 603, 604, 605 is stacked in the H direction. For example, the first horn antenna 606 and the second horn antenna 608 of the first plurality of horn antennas 602 are positioned above the third horn antenna 610 and the fourth horn antenna 612 of the second plurality of horn antennas 603 in the H direction. Antennas of the metal antenna array 600 are positioned adjacent to each other in two directions and, thus, the metal antenna array 600 may transmit a three-dimensional radar beam.

Each antenna of the metal antenna array 600 includes a chip connection end and a transmission end. In particular, a transmission end 620 of each horn antenna may be aligned at a single location in the L direction. The chip connection end of the antennas, however, may be positioned at different locations in the L direction. For example, the first horn antennas 602 have a chip connection end 616 and the third horn antennas 604 have a chip connection end 618 that is positioned farther in the negative L direction than the chip connection end 616 of the first horn antennas 602.

The metal antenna array 600 includes an outer surface 614 on a top and an outer surface 615 on a bottom. In some embodiments, the outer surface 614 and the outer surface 615 may be referred to as separate outer surfaces and, in some embodiments, they may be referred to as a single outer surface.

Each antenna of the metal antenna array 600 includes a chip connection aperture that is open at one of the outer surfaces 614, 615 of the metal antenna array 600. For example, the first horn antenna 606 includes a first chip connection aperture 622 and the third horn antenna 610 includes a third chip connection aperture 624. A RFIC may be coupled to each antenna of the metal antenna array 600 via the corresponding chip connection aperture.

Figure 7:
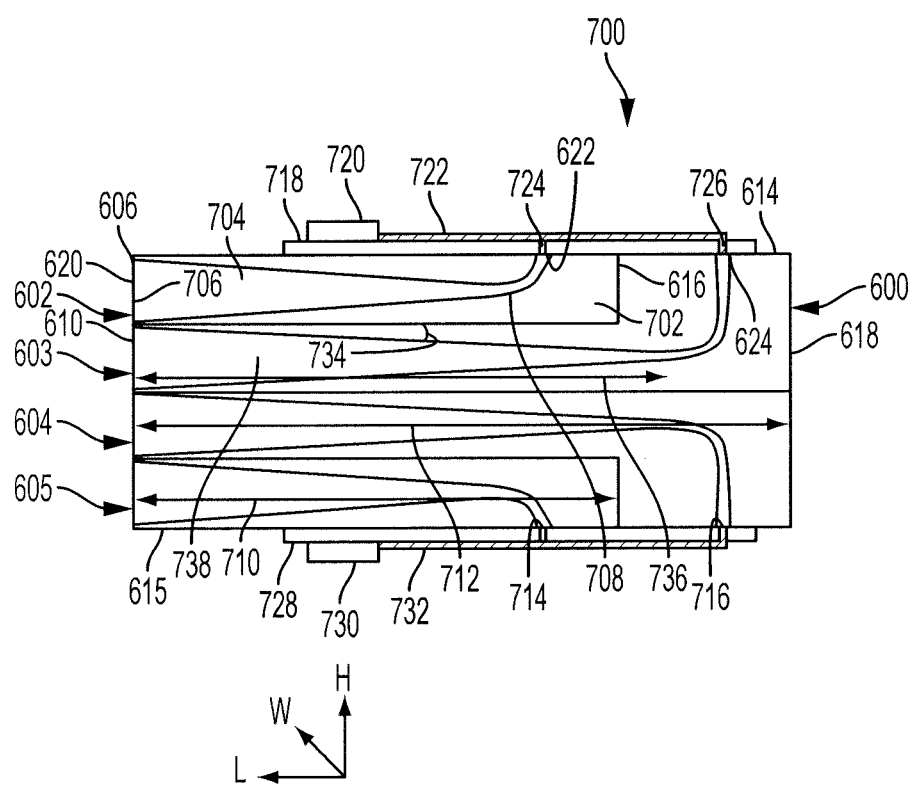
FIG. 7 is a cross-sectional view of a vehicular radar system having the metal antenna array of FIG. 6 along with two RFICs coupled to the horn end-fire antennas via PCBs according to an embodiment of the present invention.

Turning now to FIG. 7; a vehicular radar system 700 includes the metal antenna array 600. The vehicular radar system 700 also includes a first RFIC 720 coupled to the first plurality of horn antennas 602 and the second plurality of horn antennas 603 via a first PCB 718. The vehicular radar system 700 also includes a second RFIC 730 coupled to the third plurality of horn antennas 604 and the fourth plurality of horn antennas 605 via a second PCB 728.

As shown, the first horn antenna 606 includes a metal 702 that defines an opening 706 at the transmission end 620 and a conical cavity 704 positioned adjacent the opening 706. The metal 702 also defines the chip connection aperture 622 and a curved portion 708 that connects the conical cavity 704 to the chip connection aperture 622. The conical cavity 704 tapers from the opening 706 towards the curved portion 708. The curved portion 708 transitions from the conical cavity 704 extending in the L direction to the chip connection aperture 622 extending in the H direction. This allows the signal received by the RFIC 720 to be received by the first antenna 606 and transmitted by the first antenna 606 in the L direction.

The first PCB 718 may be mechanically coupled to, or positioned on, the first outer surface 614 of the metal antenna array 600. The first PCB 718 may include a plurality of metal traces 722 connecting the RFIC 720 to the various horn antennas. For example, a first metal trace 724 connects the RFIC 720 to the first chip connection aperture 622. In that regard, the RFIC 720 may transmit a signal to the first horn antenna 606 via the first metal trace 724 and the chip connection aperture 622. When the signal is received by the first horn antenna 606, it propagates through the conical cavity 704 and wirelessly propagates into the atmosphere via the opening 706. Likewise, a second metal trace 726 connects the RFIC 720 to the third horn antenna 610.

The second PCB 728 may be coupled to the second outer surface 615 of the metal antenna array 600. The second PCB 728 may include a plurality of metal traces 732 connecting the RFIC 730 to the fourth plurality of horn antennas 605 and the third plurality of horn antennas 604. In particular, the metal traces 732 may connect the RFIC 730 to a fourth plurality of chip connection apertures 714 of the fourth plurality of horn antennas 605 and to a third plurality of chip connection apertures 716 of the third plurality of horn antennas 604.

Figure 8:
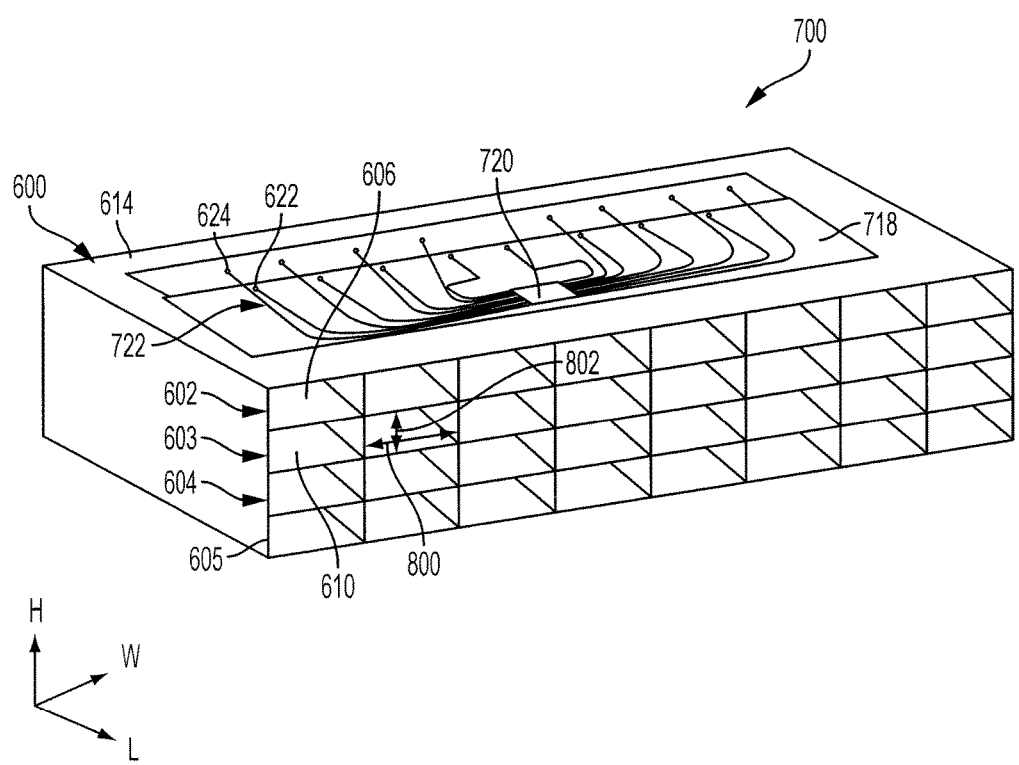
FIG. 8 is a perspective view of the vehicular radar system of FIG. 7 according to an embodiment of the present invention.

Referring briefly to FIGS. 7 and 8, the RFIC 720 may transmit a signal to each of the first plurality of horn antennas 602 and each of the second plurality of horn antennas 603. Similarly, the RFIC 730 may transmit a signal to each of the third plurality of horn antennas 604 and the fourth plurality of horn antennas 605.

The signal(s) transmitted to each of the antennas may have a different phase. In that regard, the RFIC 720 and/or the RFIC 730 may cause the metal antenna array 600 to transmit a three-dimensional radar beam and/or receive a reflected three-dimensional radar beam. Thus, the vehicular radar system 700 may be used to determine three-dimensional information corresponding to an object in its vicinity.

Various characteristics of the metal antenna array 600 can be designed to alter characteristics of the beam transmitted by the metal antenna array 600. Returning reference to FIG. 7, the beam transmitted by the metal antenna array 600 may have certain characteristics based on an angle 734 at which a conical cavity 738 of the antennas tapers. For example, the angle 734 at which the conical cavity 738 of the antennas taper may be selected such that the beam has a desired size, shape, and/or direction.

The beam transmitted by the metal antenna array 600 may also have certain characteristics based on a distance 736 of the conical cavity 738 of each antenna in the L direction. For example, the distance 736 may be selected such that the beam has a desired size, shape, and/or direction.

Additionally, and referring again to FIG. 8, the beam transmitted by the metal antenna array 600 may have certain characteristics based on a width 800 and/or a length 802 of each antenna. For example, the width 800 and/or the length 802 may be selected such that the beam has a desired size, shape, and/or direction.

The RFIC 720 may also control the size, shape, and/or direction of the beam by varying the phase of the signal transmitted by each antenna.

Returning to FIG. 7, as shown, the chip connection end 616 of the first plurality of horn antennas 602 and the fourth plurality of horn antennas 605 may be positioned farther in the L direction than the chip connection end 618 of the second plurality of horn antennas 603 and the third plurality of horn antennas 604. The first plurality of horn antennas 602 and the fourth plurality of horn antennas 605 may have a first distance 710 in the L direction. The second plurality of horn antennas 603 and the third plurality of horn antennas 604 may have a second distance 712 in the L direction. The second distance 712 may be greater than the first distance 710.

Placing the chip connection end 616 of the first horn antenna 606 farther in the L direction than the chip connection end 618 of the third horn antennas 604 allows stacking of multiple pluralities of horn antennas. This also allows a single RFIC to control of multiple rows of horn antennas. For example, this placement allows the third chip connection aperture 624 to extend to the first outer surface 614 without interfering with the first horn antennas 602. Likewise, the chip connection apertures 714 of the fourth plurality of horn antennas 605 and the chip connection apertures 716 of the third plurality of horn antennas 604 may both be positioned on the second outer surface 615, such that the second RFIC 730 can be connected to both, because the distance 710 is shorter than the distance 712.

Figure 9:
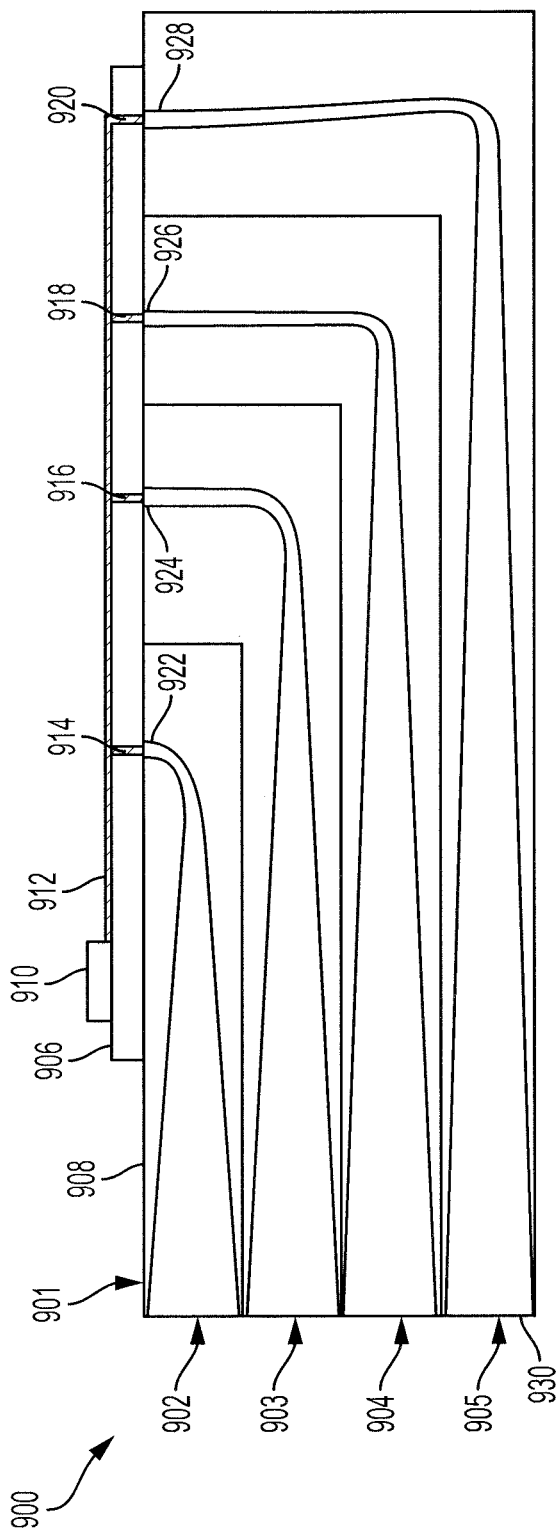
FIG. 9 is a cross-sectional view of another vehicular radar system having a plurality of horn end-fire antennas arranged in two directions relative to each other along with a RFIC coupled to each of the plurality of horn end-fire antennas via a PCB according to an embodiment of the present invention.

Turning now to FIG. 9, another metal antenna array 901 of the vehicular radar device 900 may have a different orientation than the metal antenna array 600 of FIG. 7. The metal antenna array 901 includes a first plurality of horn antennas 902, a second plurality of horn antennas 903, a third plurality of horn antennas 904, and a fourth plurality of horn antennas 905.

Each of the plurality of horn antennas 902, 903, 904, 905 may include two or more horn antennas. Each of the plurality of horn antennas 902, 903, 904, 905 may also be stacked above each other in the H direction. Each of the plurality of horn antennas 902, 903, 904, 905 may have a different distance in the L direction. For example, the fourth plurality of horn antennas 905 may have a greater distance in the L direction than the third plurality of horn antennas 904. The third plurality of horn antennas 904 may have a greater distance in the L direction than the second plurality of horn antennas 903. The second plurality of horn antennas 903 may have a greater distance in the L direction than the first plurality of horn antennas 902.

Each antenna of the metal antenna array 901 has a transmission end 930 that is positioned at the same location in the L direction. Because of this and the fact that each of the plurality of horn antennas 902, 903, 904, 905 has a different distance in the L direction, each of the plurality of horn antennas 902, 903, 904, 905 may be accessed via one flat outer surface 908 of the metal antenna array 901.

In particular, the fourth plurality of horn antennas 905 may include chip connection apertures 928 that do not interfere with any antenna of the third plurality of horn antennas 904, the second plurality of horn antennas 903, or the first plurality of horn antennas 902. Likewise, the third plurality of horn antennas 904 may include chip connection apertures 926 that do not interfere with any antenna of any of the other pluralities of antennas of the metal antenna array 901. Similarly, the second plurality of horn antennas 903 may include chip connection apertures 924 that do not interfere with any of the other pluralities of antennas of the metal antenna array 901. The first plurality of horn antennas 902 may likewise include chip connection apertures 922 that do not interfere with any of the other pluralities of antennas of the metal antenna array 901.

The vehicular radar device 900 may include a PCB 906 coupled to the outer surface 908 of the metal antenna array 901. The vehicular radar device 900 may also include an RFIC 910 coupled to each antenna of the metal antenna array 901 via the PCB 906. For example, the PCB 906 may include a plurality of metal traces 912 connecting the RFIC 910 to each antenna of the metal antenna array 901.

In particular, the PCB 906 may include a first set of metal traces 914 coupling the RFIC 910 to the first plurality of horn antennas 902. The PCB 906 may also include a second set of metal traces 916 coupling the RFIC 910 to the second plurality of horn antennas 903. The PCB 906 may also include a third set of metal traces 918 coupling the RFIC 910 to the third plurality of horn antennas 904. The PCB 906 may also include a fourth set of metal traces 920 coupling the RFIC 910 to the fourth plurality of horn antennas 905. Thus, the single PCB 906 positioned on the flat outer surface 908 of the metal antenna array 901 may control each of the pluralities of horn antennas.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A vehicular radar system for providing a volumetric scan of an environment of a vehicle, comprising:
    a first antenna array having two or more tapered slot end-fire antennas positioned adjacent to and planar to each other;
    a second antenna array having two or more tapered slot end-fire antennas positioned adjacent to and planar to each other, the two or more tapered slot end-fire antennas of the first antenna array being adjacent to the two or more tapered slot end-fire antennas of the second antenna array in a direction parallel to a plane of the two or more tapered slot end-fire antennas of the first antenna array, each of the two or more tapered slot end-fire antennas of the first antenna array and the two or more tapered slot end-fire antennas of the second antenna array having an antenna structure with a first wave-shaped section and a second wave-shaped section entirely spaced apart and oriented parallel to each other; and
    a radio frequency integrated circuit (RFIC) coupled to the first antenna array and the second antenna array and configured to:
    control the two or more tapered slot end-fire antennas of the first antenna array and the two or more tapered slot end-fire antennas of the second antenna array to transmit a signal to form one or more beams to scan in three-dimensions.

2. The vehicular radar system of claim 1 wherein the RFIC is further configured to change a direction of the one or more beams by adjusting a phase of each of the two or more tapered slot end-fire antennas of the first antenna array and the two or more tapered slot end-fire antennas of the second antenna array.

3. The vehicular radar system of claim 1 wherein each of the two or more tapered slot end-fire antennas of the first antenna array and the two or more tapered slot end-fire antennas of the second antenna array includes:
    a printed circuit board (PCB) having a top, a bottom, a chip connection end, and a transmission end; and
    metal defining a ground structure on the bottom of the PCB and the antenna structure, wherein the antenna structure is on the top of the PCB and has:
    a chip connection lead positioned adjacent to the chip connection end of the PCB and electrically coupled to the RFIC,
    a balun positioned adjacent the chip connection lead and configured to convert an unbalanced signal to a balanced signal or to convert a balanced signal to an unbalanced signal, and
    a tapered section positioned between the balun and the first and second wave-shaped sections and tapered towards the balun.

4. The vehicular radar system of claim 3 wherein the antenna structure further includes at least two beam adjustment features positioned within the space between the first wave-shaped section and the second wave-shaped section and configured to adjust a beam direction of the signal transmitted by the antenna structure such that the signal forms an angle with the top of the PCB or the bottom of the PCB.

5. The vehicular radar system of claim 4 wherein at least one of a size of the at least two beam adjustment features or a distance between each of the at least two beam adjustment features is selected such that the signal forms a desired angle with the top of the PCB or the bottom of the PCB.

6. The vehicular radar system of claim 1 wherein at least one of a distance between each of the two or more tapered slot end-fire antennas of the first antenna array and each of the two or more tapered slot end-fire antennas of the second antenna array or a distance between the first antenna array and the second antenna array is selected to achieve a desired size and beam direction of the one or more beams.

7. The vehicular radar system of claim 1 further comprising a backplane coupled to the first antenna array, the second antenna array, and the RFIC such that the RFIC is electrically coupled to at least one of the first antenna array or the second antenna array via the backplane.

8. The vehicular radar system of claim 1 wherein at least one of:
    the one or more beams include a first beam formed by a combination of each of the two or more tapered slot end-fire antennas of the first antenna array and a second beam formed by a combination of each of the two or more tapered slot end-fire antennas of the second antenna array; or
    the one or more beams include a single beam formed by a combination of each of the two or more tapered slot end-fire antennas of the first antenna array and each of the two or more tapered slot end-fire antennas of the second antenna array.

9. A vehicular radar system for providing a volumetric scan of an environment of a vehicle, comprising:
    a first antenna array having two or more tapered slot end-fire antennas positioned adjacent to and planar to each other;
    a second antenna array having two or more tapered slot end-fire antennas positioned adjacent to and planar to each other, the two or more tapered slot end-fire antennas of the first antenna array being adjacent to the two or more tapered slot end-fire antennas of the second antenna array in a direction parallel to a plane of the two or more tapered slot end-fire antennas of the first antenna array, each of the two or more tapered slot end-fire antennas of the first antenna array and the two or more tapered slot end-fire antennas of the second antenna array having an antenna structure with a first wave-shaped section and a second wave-shaped section entirely spaced apart and oriented parallel to each other;
a first radio frequency integrated circuit (RFIC) coupled to the first antenna array and configured to control the two or more tapered slot end-fire antennas of the first antenna array to transmit a first signal to form a first beam having a first shape and a first size; and
a second RFIC coupled to the second antenna array and configured to control the two or more tapered slot end-fire antennas of the second antenna array to transmit a second signal to form a second beam having a second shape and a second size, the first shape or the first size being different than the second shape or the second size, respectively, the first beam and the second beam being used for radar scanning.

10. The vehicular radar system of claim 9 wherein each of the two or more tapered slot end-fire antennas of the first antenna array and the two or more tapered slot end-fire antennas of the second antenna array includes:
a printed circuit board (PCB) having a top, a bottom, a chip connection end, and a transmission end; and
metal defining a ground structure on the bottom of the PCB and the antenna structure, wherein the antenna structure is on the top of the PCB and has:
a chip connection lead positioned adjacent to the chip connection end of the PCB and electrically coupled to the first RFIC or the second RFIC,
a balun positioned adjacent the chip connection lead and configured to convert an unbalanced signal to a balanced signal or to convert a balanced signal to an unbalanced signal, and
a tapered section positioned between the balun and the first and second wave-shaped sections and tapered towards the balun.

11. The vehicular radar system of claim 10 wherein the antenna structure further includes at least two beam adjustment features positioned within the space between the first wave-shaped section and the second wave-shaped section and each having a size and a spacing therebetween that is selected to form a desired angle with the top of the PCB or the bottom of the PCB.

12. The vehicular radar system of claim 9 further comprising a backplane coupled to the first antenna array, the second antenna array, the first RFIC, and the second RFIC such that the first RFIC and the second RFIC can communicate to achieve desirable characteristics from the first beam and the second beam.

13. A vehicular radar system for providing three-dimensional information regarding an environment of a vehicle, the vehicular radar system comprising:
a first end-fire antenna being on a first plane;
a second end-fire antenna located adjacent to the first end-fire antenna and on the first plane with the first end-fire antenna;
a third end-fire antenna being on a second plane and being adjacent to the first end-fire antenna in a direction parallel to the first plane; and
a fourth end-fire antenna located adjacent to the third end-fire antenna and on the second plane, the fourth end-fire antenna being adjacent to the second end-fire antenna in a direction parallel to the first plane, each of the first end-fire antenna, the second end-fire antenna, the third end-fire antenna and the fourth end-fire antenna having an antenna structure with a first wave-shaped section and a second wave-shaped section entirely spaced apart and oriented parallel to each other.

14. The vehicular radar system of claim 13 wherein the first end-fire antenna and the second end-fire antenna are located on a first printed circuit board that is located on the first plane, and the third end-fire antenna and the fourth end-fire antenna are located on a second printed circuit board that is located on the second plane.

15. The vehicular radar system of claim 14 further comprising a backplane coupled to the first end-fire antenna and the second end-fire antenna via the first printed circuit board, and coupled to the third end-fire antenna and the fourth end-fire antenna via the second printed circuit board.

16. The vehicular radar system of claim 15 further comprising at least one controller coupled to each of the first end-fire antenna, the second end-fire antenna, the third end-fire antenna, and the fourth end-fire antenna and configured to control each of the first end-fire antenna, the second end-fire antenna, the third end-fire antenna, and the fourth end-fire antenna to transmit signals, at least some of which having different phases for forming one or more radar beams for volumetric radar scanning.

17. The vehicular radar system of claim 16 wherein the at least one controller includes one controller coupled to each of the first end-fire antenna, the second end-fire antenna, the third end-fire antenna, and the fourth end-fire antenna via the backplane.

18. The vehicular radar system of claim 16 wherein the at least one controller includes a first controller located on the first printed circuit board and connected to the first end-fire antenna and the second end-fire antenna, and a second controller located on the second printed circuit board and connected to the third end-fire antenna and the fourth end-fire antenna.

19. The vehicular radar system of claim 13 wherein each of the first end-fire antenna, the second end-fire antenna, the third end-fire antenna, and the fourth end-fire antenna includes:
a transmission end from which a signal is transmitted;
a chip connection end configured to receive the signal to be transmitted; and
a tapered section located between the chip connection end and the first and second wave-shaped sections and tapered towards the chip connection end.

20. The vehicular radar system of claim 19 wherein each of the first end-fire antenna, the second end-fire antenna, the third end-fire antenna, and the fourth end-fire antenna includes at least one beam adjustment feature located within the space between the first wave-shaped section and the second wave-shaped section and configured to adjust a beam direction of signals transmitted by each of the first end-fire antenna, the second end-fire antenna, the third end-fire antenna, and the fourth end-fire antenna.

* * * * *